Sept. 11, 1962 A. P. DE SEVERSKY 3,053,029
GAS CONDITIONER
Original Filed Jan. 5, 1955 4 Sheets-Sheet 1

INVENTOR.
ALEXANDER P. DE SEVERSKY
BY
ATTORNEYS

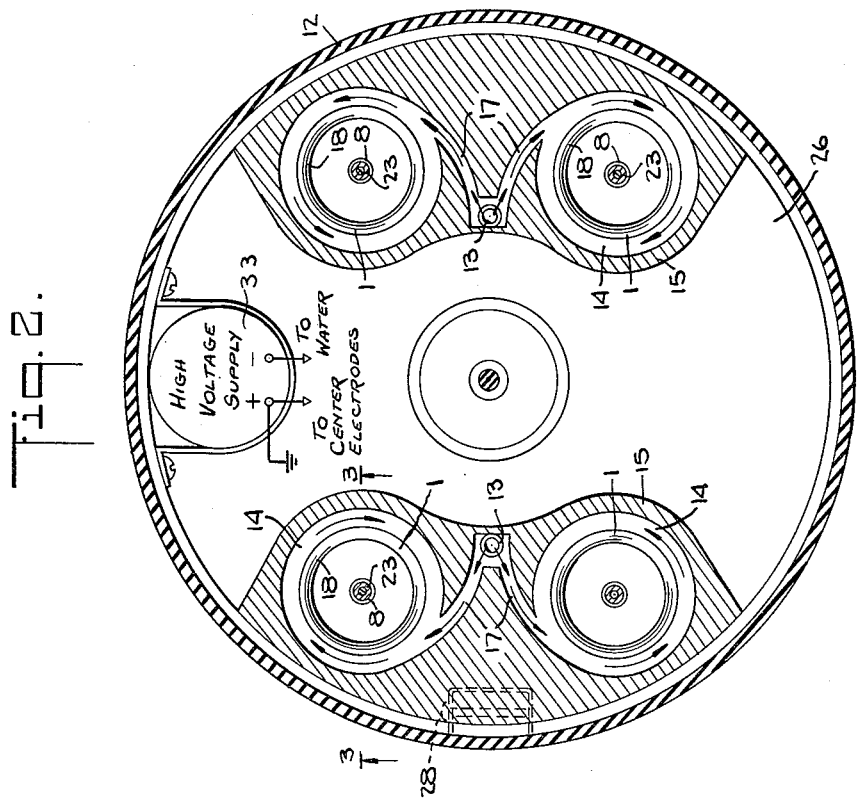
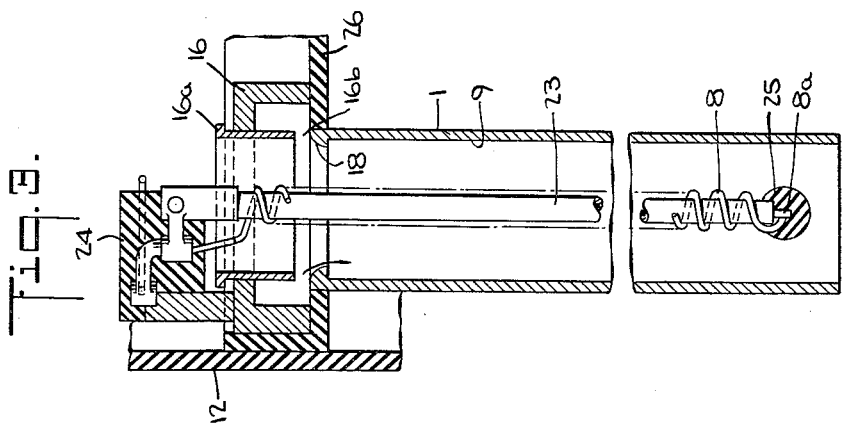

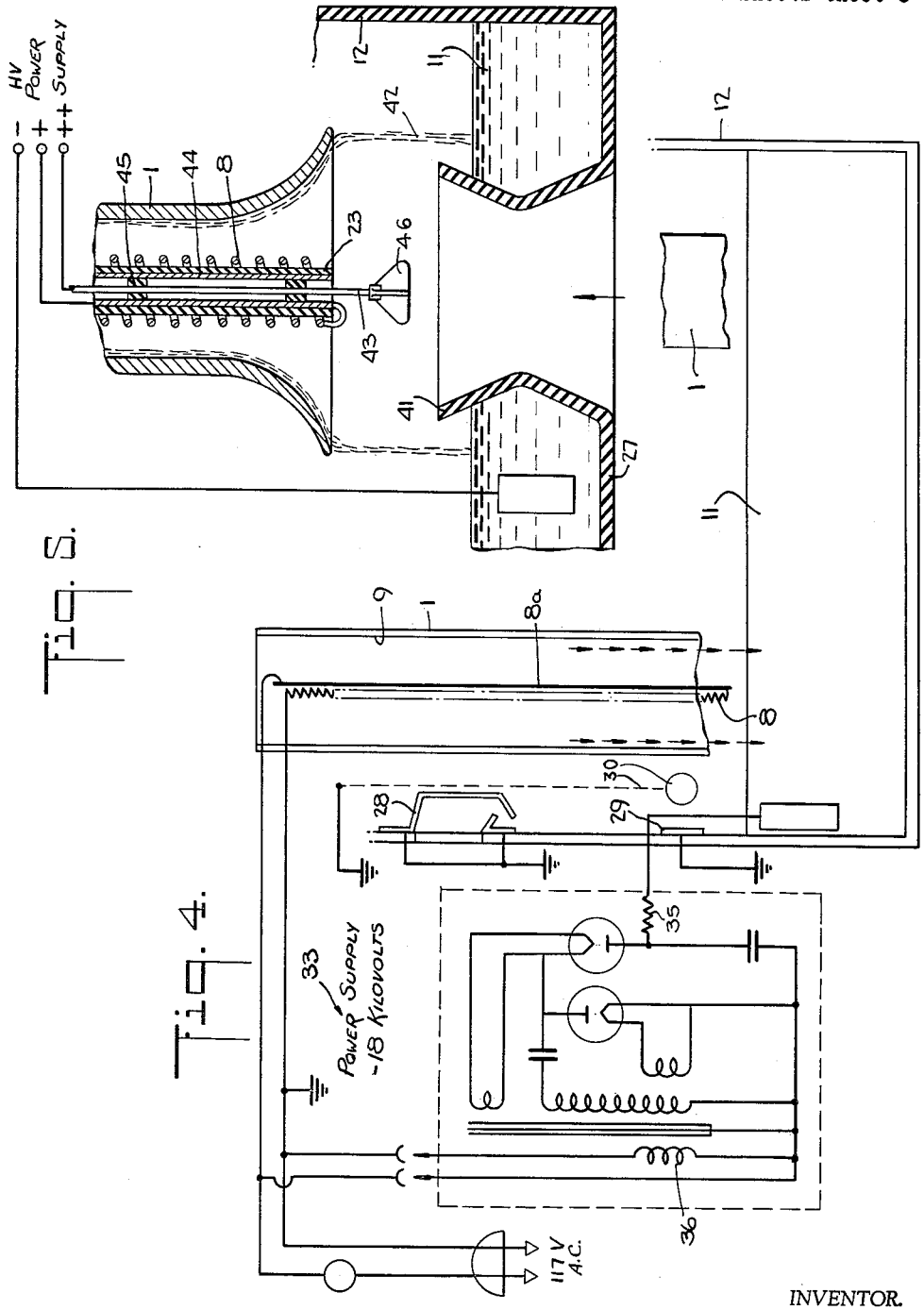

Sept. 11, 1962　　　A. P. DE SEVERSKY　　　3,053,029
GAS CONDITIONER

Original Filed Jan. 5, 1955　　　4 Sheets-Sheet 4

INVENTOR.
ALEXANDER P. DE SEVERSKY
BY
*Kenyon & Kenyon*
ATTORNEYS

United States Patent Office 3,053,029
Patented Sept. 11, 1962

3,053,029
GAS CONDITIONER
Alexander P. de Seversky, Northport, N.Y., assignor to Electronatom Corporation, New York, N.Y., a corporation of New York
Original application Jan. 5, 1955, Ser. No. 479,909, now Patent No. 2,937,709, dated May 24, 1960. Divided and this application Nov. 25, 1959, Ser. No. 855,369
4 Claims. (Cl. 55—118)

The present invention relates generally to gas conditioning devices, and more particularly to an improved apparatus for cleaning, humidifying and heating a gaseous stream passing therethrough. This application is a division of my co-pending application Serial No. 479,909 filed January 5, 1955, now Patent No. 2,937,709.

The electrostatic precipitation of dust, smoke and like particles from the atmosphere is an art which has hitherto been confined almost exclusively to industrial applications, probably because of the unavailability of simple and effective apparatus which would not only be safe in the hands of non-industrial users but which would also withstand the abuse and lack of servicing which it would be apt to encounter in the hands of such users.

Accordingly, it is the primary object of the present invention to provide a precipitator which will satisfy the latter need, and to that end it aims at providing such essential features as: self-cleaning, operability in positions of abnormal tilt, large capacity in minimized structure, and safety against accidental electric shocks.

More particularly, it is an object of the invention to provide a gas conditioner including an electrostatic precipitator tube having a central electrode therein which is adapted not only to establish an electrostatic field in the tube for the precipitation of particles from the gaseous stream, but which also serves to heat the gas to a desired temperature. A significant feature of the invention resides in the fact that the central electrode is incandescent and self-cleaning, in that the electrical heater element thereof functions to burn off dust particles which would otherwise adhere thereto.

A further object of the invention is to provide an electrostatic precipitator of the water film type in conjunction with a heated central electrode, whereby the gas stream is both heated and humidified by evaporation from the water film.

Precipitators are known which make use of a film or curtain of water along the inner wall of the tube to carry away the precipitated particles. However, wet precipitators of the type heretofore known must be carefully maintained in a level position in order to sustain the film uniformly on the inner surface of the tube. Consequently, their use is limited to stationary industrial applications. Accordingly, still another object of the invention is to provide a fluid distributor coupled to the upper end of a precipitator tube and adapted to form a substantially uniform and smooth film of water on the inner wall of the tube and to maintain the uniformity of this film even in those situations where the tube is positioned with a considerable degree of tilt, or is subjected to mechanical vibration and shock. A precipitator in accordance with the invention can be successfully applied not only to stationary industrial and home uses but to various forms of automotive transportation, such as diesel trucks, automobiles, trains, steamships, etc., without the roll, pitch, or gradient of the roadbed impairing the efficient functioning of the precipitator.

Yet another object of the invention is to provide in conjunction with an electrostatic precipitator tube of the water film type a gas inlet device adapted to feed gas into the lower end of the tube in a manner developing aerodynamic forces tending to support and smooth the water film. A gas inlet device in accordance with the invention makes possible an increased gas velocity in the tube without disruption of the water film therein.

A further object of the invention is to provide a precipitator structure including a plurality of concentric electrodes, wherein the outer electrode of one gas conduit also acts as the inner electrode of another gas conduit.

Also an object of the invention is to provide a precipitator in which the gas containing suspended particles is passed through successive electric fields, in the first of which the particles are electrically pre-ionized and in the second of which the pre-ionized particles are precipitated and trapped against redispersion into the gas stream, and are continually removed from the collecting surface. An important aspect of the pre-ionization stage in accordance with the invention is that it is anti-fouling and self-cleaning. Another outstanding feature of the invention resides in the use of a pre-ionization electrode secured to the lower end of the central electrode of the precipitator tube and functioning to stabilize the central electrode with respect to oscillations produced by the inrushing air stream.

It is also an object of the invention to provide a highly compact, mechanically rugged and efficient gas conditioning device which may be manufactured and sold at relatively low cost.

For a better understanding of the invention, as well as other objects and further features thereof, reference is made to the following detailed description to be read in conjunction with the accompanying drawings wherein like components in the several views are identified by like reference numerals. In the drawings:

FIG. 2 is a horizontal cross-section taken along the line 2—2 of FIG. 1.

FIG. 3 is a longitudinal sectional view of one of the precipitator tubes and its associated fluid distributor housed within the apparatus.

FIG. 4 is a schematic circuit diagram of the electrical power supply for the apparatus.

FIG. 5 illustrates in section a third preferred modification of a precipitator tube in conjunction with an air intake device and including a pre-ionization stage.

FIG. 6 illustrates diagrammatically another embodiment of a precipitator tube in accordance with the invention.

Figure 1:
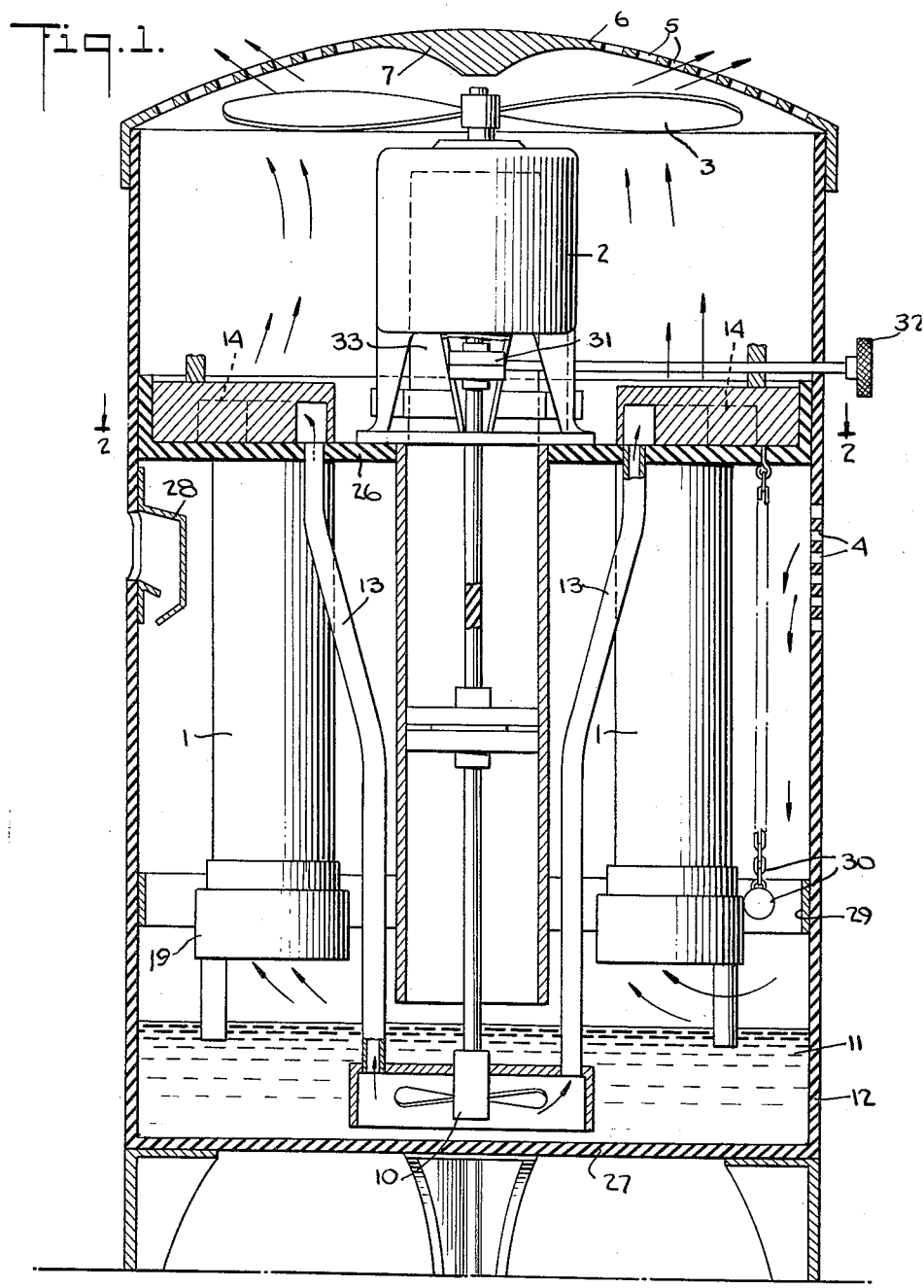
FIG. 1 is a vertical cross-sectional view taken through one preferred embodiment of a gas conditioning apparatus in accordance with the invention.

Referring now to the drawings and more particularly to the FIGURES 1 and 2, a form of the precipitator related to the invention comprises a plurality (four) of precipitator tubes 1 which are symmetrically arranged within a housing and are in the form of cylindrical conduits through which the air to be cleaned is passed while precipitation is accomplished by electrostatic fields presently to be explained. The air is propelled by the fan 3 which is driven by motor 2; it enters an intake 4 and flows downward in the direction indicated by the arrows to enter precipitators 1 through their bottoms, and it then flows up into the space around the fan and out through the annular outlet 5 in the top of the machine. The top cover 6 of the machine in which the annular outlet 5 is formed has a generally cone-shaped portion 7 depending from its center. The purpose of this cone-shaped portion is to deflect the air from the fan out of the apparatus in a horizontal direction which tends to cause the surrounding air to circulate such that contaminated air will be pushed downward outside of the apparatus and thus sucked more readily into its interior.

While the apparatus is described in connection with the conditioning of air, it is to be understood that it is applicable also to other gases, such as furnace exhausts and the like. While there is disclosed four precipitator tubes symmetrically surrounding the pumps and fan structure, it will be appreciated that any desired number of tubes may be employed for this purpose.

In accordance with one of the principal objectives of the invention, the precipitated particles are continuously washed from the precipitator tubes 1 by forming the outer or collecting electrode as a curtain of water or equivalent liquid, the uniformity of the water curtain being maintained even where the tube is tilted. This curtain is caused to flow uniformly down the cylindrical surface of the tubes 1 so that an unbroken cylinder of liquid is provided. This cylindrical curtain or cylinder of liquid is electrified by applying a potential to it with respect to the central filamentary electrode or heaters 8 positioned along the axis of the walls 9 which form the guide for the fluid. These walls may be of any suitable material, metallic or nonmetallic. The fluid is caused to flow continuously by the pump 10 driven by the motor 2, the pump drawing fluid from the reservoir or pool 11 in the bottom of the housing 12 and pumping it up through the tubes 13 into the annular fluid distributor chambers 14 at the top of the precipitator tubes 1.

An important feature of the invention is the following construction which not only causes the fluid to flow in an unbroken, thin film over the entire inner surface of the walls 9 but also permits the apparatus to suffer small tilts from the vertical without destroying the uniformity of this film flow. It will be realized that apparatus designed for non-industrial usage will often be positioned other than in a strictly vertical position by non-expert users. This must be taken into account if a practical apparatus is to be had.

As best illustrated by the FIG. 3, the outer walls of the fluid distributor chambers 14 are formed by cylindrical walls 15 concentrically surrounding each tube 1 and having inwardly projecting flanges 16 to help hold the fluid in; the inner walls are formed by cylindrical collars 16a which are adjustable upward and downward to vary the length of the cylindrical gap 16b between walls 9 and collars 16a. This adjustability permits control of the water-flow and the resultant thickness of the film flowing down walls 9.

Suitable means controllable from the exterior of the apparatus may be provided to adjust the axial positions of collars 16a.

Fluid enters fluid distributor chambers 14 tangentially through the tubes 17 which interconnect with tubes 13, as seen in FIG. 2, and whirls about the annular walls of the chambers so that it tends to enter the tubes 1 with a spiral motion. While this spiral motion helps to some extent in maintaining the unbroken uniformity of the film flowing down the walls 9, that uniformity is still better maintained by the annular inwardly projecting lips or weir ring 18 around the top edge of the tubes 1. As the liquid flows over the lips 18 in its downward course, they deflect the liquid towards the walls 9 so that it is brought into early engagement with the walls, and any tendency to dripping, or streaming of the liquid in particular paths over the surface of walls 9, is minimized. This action of the lips 18 in deflecting the course of the flowing liquid toward the walls 9 is in accordance with known hydro-dynamic principles, a familiar example of which is the tendency of fluid which is poured from a bottle or a spout to flow backward into engagement with the outer wall of the bottle or the spout even though the bottle or spout be inclined to the vertical.

The fluid distributor chamber 14 is designed not only to provide a helical flow of liquid throughout the precipitator tube but also to compel the water to cross the weir ring 18, not radially but at an angle thereto for smoother flow. In addition, the water is injected tangentially to impart thereto the required centrifugal force in order to control the water pressure at the gap 16b. The centrifugal force imparted to the water by the jets is also used to counteract the water pressure, thus achieving exact control of the water film and at the same time preventing the uncovering of the film at a considerable degree of tilt.

The water after passing over the weir ring 18 is diverted, in accordance with physical law, from a vertical path toward the wall of the precipitator tube 1, and therefore undergoes peripheral expansion, thereby making it possible to produce a water film as thin as desired, limited only by the inherent viscosity of the liquid. It is known from physics that if an interference is introduced on the side of a smooth column of liquid flow, the entire stream is deflected in the direction of the interference below the point of the interference. Accordingly, the step on weir ring 18 is designed so that water is deflected sufficiently to make contact with tube 1, thereby reducing the thickness of the water film and effecting an even flow.

In order to prevent a tendency of the incoming air coming into the tubes 1 at the bottom from sucking back into the tubes 1 any water or liquid which is dripping from their bottoms into the pool 11, the construction shown at the bottom of the tubes in FIG. 1 is provided. As indicated there, the lower end of each tube 1 is surrounded by an annular chamber 19 the inner wall of which is formed by the cylindrical portion 20 of somewhat smaller diameter than the tube 1. These portions 20 project, as indicated, into their tubes 1 and leave annular gaps 21 between themselves and the walls 9. Water flowing down the inner walls 9 goes through the gaps 21 and into the chamber 19 and from there into the pool 11 by way of the ducts 22. This effectively prevents any dripping in the path of the incoming air shown by the arrow and running through the portions 20.

FIG. 3 shows the construction of the central electrode or filament 8. They may be of any suitable form, such as the spiral configuration shown on the insulating support 23, and they may be of sufficient size that they may also be used as heaters in the event that it is desired to use the apparatus as a means of warming the air in any room in which it is used, or for humidifying by evaporation of water flowing down tubes 1. The degree of heat furnished may be readily controlled by varying current flow through the heater elements by suitable control means.

Since the high voltages to which a machine of this kind is subjected tend to cause corona and leakage losses, these are minimized by embedding at least the upper portions of the electrode structure in the insulating material 24. Moreover, the lower ends of the electrodes 8 are equipped with the balls 25 or some other suitable terminal of similar non-pointed configuration which tends to minimize corona discharge. The heating element 8 may consist of a Nichrome or other suitable resistance wire, while the insulating tube support 23 may be formed of dielectric tubing such as asbestos, glass, porcelain or glass-bonded mica.

The current path for the heater coil 8 is through the metallic core 8a disposed centrally in dielectric tube 23 and connected at its lower end to the lower terminal of coil 8, the current return being through coil 8. By varying the size and shape of the heater wire 8 at the lower end of the center electrode, pre-ionization of the incoming gas may be effected. The heater wire is preferably operated at incandescence, thereby burning off dirt deposits. Thus the center electrode remains clean and the apparatus continues to be operative during uninterrupted use, irrespective of the precipitation density. Where the precipitator is used to draw outside air into a room, the heater electrode is of particular value in that the apparatus cleans, heats and humidifies the air fed into the room. Radiating fins distributed longitudinally on the heater wire may be used to provide a better heat exchange.

The whole apparatus is housed within the insulating, generally cylindrical housing 12 (FIG. 1), having an internal transverse wall 26, also of insulating material, for supporting the various elements, and a bottom wall 27. Occasional replenishment of the pool 11 may be accomplished by pouring liquid in the labyrinth-like inlet 28 of conductive metal. The point of this construction is that the water poured in, as from a spout, cannot drop directly to the pool 11 which might be at a dangerous potential with respect to the user. Since the water must contact the metal surface of the inlet 28 which can be grounded, there is no danger of a direct electrical connection being established between the pool 11 and the user through any column of water which might be dropping from a spout in the user's hands.

Further safety measures are the metallic ring 29 which surrounds the inner wall of the housing 12 and the metallic ball and chain 30. Both this ring 29 and the ball and chain 30 may be grounded which means that if the apparatus should accidentally be tipped during the time when dangerous voltage is applied to the pool 11, the pool 11 will flow into contact with either the ring 29 or the ball and chain 30 and thus be grounded. In any such tilting the ball and chain swings to insure engagement with the pool.

The motor 2 drives both the fan 3 and the pump 10. It may be desirable sometimes to use the unit only as a fan and not as a precipitator. In this case, the motor may be detached from pump 10 by a clutch 31 operable through a knob 32. It is understood, of course, that proper insulation between the pump 10 and the motor shaft is effected so that the dangerous potential of the pool 11 cannot be transmitted to the motor or to the knob 32, and this is readily accomplished by making portions of the motor shaft running to pump 10 of insulating material. The section of the shaft which is of insulating material should, of course, be inserted well above the water level.

Any suitable source of high voltage may be used and positioned at any suitable place in the apparatus. It is illustrated by the high voltage generator 33 (FIGURES 1 and 2).

FIG. 4 shows the electrical circuit. The source of high voltage 33 is illustrated as a conventional electron tube generator of, say, 18 kilovolts. Its negative terminal is embedded in the pool 11 so that the pool is charged and the positive terminal is connected to grounded center electrode 8, thereby establishing an electrostatic field in the space between electrode 8 and the surrounding cylinder of water. Of course, the reverse polarity may be used relative to ground. That is to say, the center electrode could be connected to the positive terminal of the source, while the water is connected to the negative terminal and grounded. As indicated, the inlet 28 is grounded as is also ball and chain 30 and the ring 29. A suitable resistor 35 protects the high-voltage generator in case of a short circuit.

It will be understood, of course, that as the liquid (usually water) is continually pumped by pump 10 to the chambers 14 and allowed to flow uniformly down the surfaces previously indicated, the potential applied to the pool 11 by the generator 33 will also be applied to the film of water which is flowing down the wall 9. The electrode 8 is grounded, as indicated, through the 117 v. power-line which heats it to incandescence and which also energizes the primary winding 36 of the transformer in the generator. Thus, a high potential exists between the inner electrodes 8 and the water films or curtains flowing downward over the inner surfaces of tubes 1. This high potential acts to remove dust, smoke and other particles from the air which is flowing through the conduit tubes 1, and the water washes it into the pool 11.

Referring now to FIG. 5, there is shown precipitator tube 1 in conjunction with an inlet tube 41 so arranged as to define a pre-ionization space, whereby incoming air containing suspended particles is passed through successive electric fields, in the first of which the particles are electrically charged and in the second of which the charged particles are precipitated and trapped against redispersion into the air stream.

Inlet tube 41 is provided with a constricted central portion to produce a venturi effect, the upper end of the inlet tube being spaced from the bottom end of the precipitator tube 1 to form a pre-ionization space therebetween which is surrounded by the curtain of water 42 flowing downwardly from the mouth of the tube 1 into the water pool 11. The central electrode of the precipitator is constituted by a dielectric tube 23 and a helical heater coil 8 wound thereon, corresponding to the same element in the embodiment in FIG. 1. Extending through the dielectric tube 23 is a coaxial line formed by an inner conductor 43 and an outer conductor 44. The outer conductor 44 serves as a current path for the heater coil 8 and is connected thereto at the lower end of the coil. The inner conductor 43, which is supported within the outer conductor 44 by suitable dielectric beads 45, projects beyond the outer conductor into the pre-ionization space. Attached to the end of inner conductor 43 and suspended therefrom are ionization electrode vanes 46, which are constituted by four vane sections in quadrature relation. These vanes which are provided with sharp edges to promote ionization effects are preferably given the aerodynamic shape of a symmetrical air foil or some other air foil suitable for the purpose of stabilization. The presence of the vanes in the air stream serves not only to afford a pre-ionization field but also to maintain the central electrode within the precipitator tube 1 in parallel relation to the air stream, thereby preventing mechanical oscillation and vibration thereof.

As with the previously disclosed devices, an electrostatic field is established between the central electrode 8 and the water film on the inner surface of tube 1, the film acting as a collector electrode and being negatively biased relative to the central electrode. The coaxial conductor arrangement 43, 44 is such that a potential independent of the central electrode potential may be impressed on the pre-ionization electrode 46, whereby the optimum electrostatic field for pre-ionization may be established in the annular space formed between electrode 46 and the surrounding water curtain 42. The potential of pre-ionization electrode 46 is fixed by consideration respecting the optimum electrostatic field for collection when center electrode 8 is grounded. Alternatively, of course, the water 11 on the pre-ionization electrode 46 may be grounded, provided the remaining electrodes maintain proper potentials for their respective functions.

It is possible also to operate the pre-ionization electrode at the same potential as that of the central electrode 8, in which event the central electrode structure may be similar to that shown in FIG. 3, with the pre-ionization electrode 46 suspended below the corona ball 25. The span of the vanes on the pre-ionization electrode could be calculated so as to provide maximum pre-ionization without breakdown if the potential thereon is the same as on central electrode 8. However, where it is found desirable to impress on the pre-ionization electrode a greater potential than that on the central electrode 8, as shown in FIG. 5, then the geometric configuration of the vanes could be of a lesser span or aspect ratio.

It is to be noted that the pre-ionization means in accordance with the invention is inherently self-cleaning, for whatever contaminant is collected by water curtain 42 is deposited in water pool 11. Thus, there is no need to dismantle the pre-ionizer for regular cleaning as with conventional devices, and the efficiency of the pre-ionizer is not diminished by the accretion of deposits. The pre-ionization electrode may also be heated to burn off particles therefrom.

Referring now to FIG. 6 there is shown the preferred form of the precipitator comprising a concentric arrangement of tubes. In this arrangement a center tube 54 is provided which is surrounded by a second tube 55, in turn surrounded by a third tube 56. An annular gas passage is defined between tubes 54 and 55 and another such passage is defined between tubes 55 and 56. Distributors (not shown), generally of the type disclosed in connection with FIG. 3, are provided in conjunction with the upper ends of the tubes so as to cause a water film to form on the outer surface of center tube 54 and on both the inner and outer surfaces of second tube 55, as well as on the inner surface of third tube 56. The upper ends of the tubes are provided with lips 54a, 55a and 56a, respectively, which lips serve the same purpose as lip 18 in FIG. 3 in conjunction with the distributor operation. It will be noted that the lip for tube 55 extends both inwardly and outwardly, for the water film is formed on both the inner and outer surfaces thereof.

Figure 7:
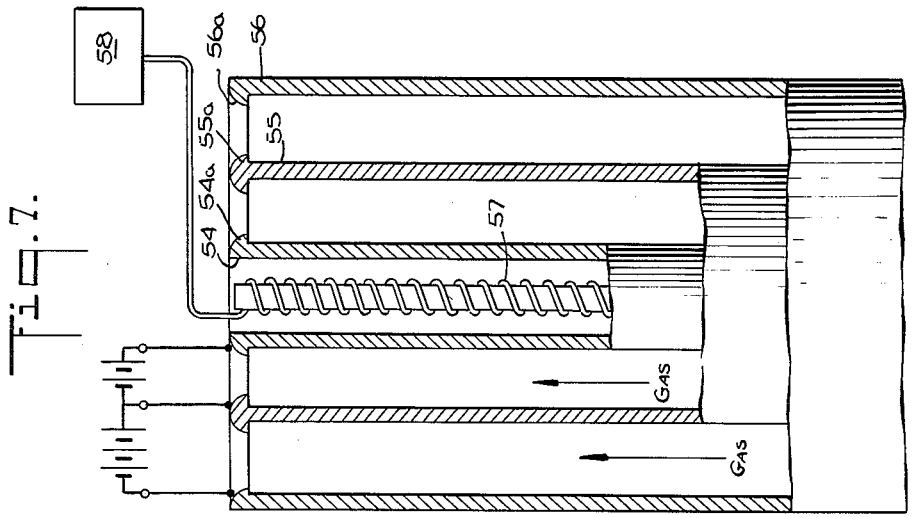
FIG. 7 illustrates diagrammatically another embodiment of a precipitator tube having a heating means in accordance with the invention.
Figure 8:
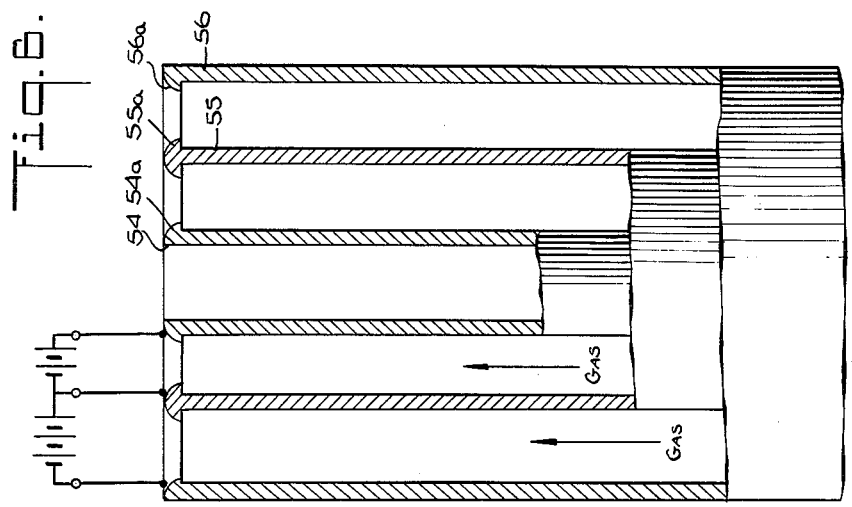

Established between the water films on tubes 54 and 55 and also between the water films on tubes 55 and 56 are respective potential differences effecting the precipitation of particles from gases in the associated passages. The particles are carried by the water films into water pools, a separate water supply and pool being used in conjunction with each electrode to prevent short circuiting of the applied potentials. It is to be understood that while three concentric tubes are disclosed herein to define two gas passages, a greater number may be employed, as desired, to produce a series of concentrically arranged annular gas passages. In practice, the different passages may be employed for contaminants which differ, for example, with respect to particle size or density, the electric field in each passage being adapted to precipitate the particular contaminant therein. Separation of the contaminants in the gas prior to their introduction into the lower ends of the tubes may be effected by conventional centrifuge means, whereby heavier particles tend to enter the outer passage and lighter particles the inner passage. It is also to be understood that a precipitator constituted by but two tubes, such as tubes 54 and 55, may be used wherein the inner and outer electrodes are constituted by water films, as distinguished from the arrangement shown in FIG. 3 wherein only the outer electrode is a water film. As shown in FIG. 7, the hollow inner tube 54 may also be provided with suitable heater means 57 connected to power source 58 and in large installations may be so dimensioned as to serve as a housing for the power supply.

While there has been disclosed what at present are considered to be preferred embodiments of the invention, it is to be understood that many changes and modifications may be made therein without departing from the essential spirit of the invention. It is intended therefor in the appended claims to cover all such changes and modifications as fall within the true scope of the invention.

What is claimed is:

1. An electrical precipitator comprising a central tube providing a non-precipitating work area, first and second tubes concentrically disposed about said central tube, each of said tubes having substantially continuous surfaces, the space between said central and first tube and the space between said first tube and said second tube constituting respective passages through which contaminated gases may flow in a substantially vertical direction; first, second and third flow distributors coupled to the upper ends of said central tube, said first and second tubes respectively to cause liquid to flow in a uniform film over the outer surface of said central tube, the inner and outer surfaces of said first tube and the inner surface of said second tube means for establishig a first electrical potential between the films on the outer surface of the central tube and the inner surface of the first tube, and means for establishing an electrical potential between the films on the outer surface of the first tube and the inner surface of the second tube, said electrical potentials establishing electrostatic fields thereby to precipitate contaminants in said gases.

2. A precipitator, as set forth in claim 1, wherein said first distributor includes an outwardly projecting lip around the upper edge of said central tube, said second distributor includes inwardly and outwardly projecting lips around the upper edge of the first tube, and said third distributor includes an inwardly projecting lip around the upper edge of said second tube, each distributor further including means for flowing liquid over the related lips.

3. An electrical precipitator comprising a central tube providing a non-precipitating work area, a second tube concentrically disposed about said central tube to define an annular passage between the outer surface of the central tube and the inner surface of the second tube through which contaminated gases may flow, said tubes having substantially continuous surfaces, means to cause liquid to flow in a uniform film over said inner and outer surfaces, and means for establishing an electrical potential between said film over said one of said surfaces and the other of said surfaces thereby to establish an electrostatic field to precipitate contaminants in said gases.

4. An arrangement as set forth in claim 3 further including a heater disposed within said central tube.

References Cited in the file of this patent

UNITED STATES PATENTS

| | | |
|---|---|---|
| 1,250,088 | Burns | Dec. 11, 1917 |
| 1,378,224 | Girvin | May 17, 1921 |
| 1,905,993 | Buff | Apr. 25, 1933 |
| 1,968,334 | Crowder | July 31, 1934 |
| 2,056,430 | Monhebel et al. | Oct. 6, 1936 |
| 2,696,275 | Pring | Dec. 7, 1954 |
| 2,751,036 | Busfield | June 19, 1956 |

FOREIGN PATENTS

| | | |
|---|---|---|
| 809,757 | France | Dec. 12, 1936 |
| 611,137 | Great Britain | Oct. 26, 1948 |
| 857,642 | Germany | Dec. 1, 1952 |